(12) United States Patent
de Wit et al.

(10) Patent No.: US 6,221,951 B1
(45) Date of Patent: Apr. 24, 2001

(54) KETONE POLYMER/FIBER COMPOSITIONS

(75) Inventors: Gerrit de Wit, Ossendrecht; Johannes Gosens, Roosendaal; Johannes Lohmeijer, Hoogerheide, all of (NL)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 09/082,859

(22) Filed: May 21, 1998

(51) Int. Cl.$^7$ .................................................. C08J 195/409
(52) U.S. Cl. ......................... 524/494; 524/492; 524/493; 523/200
(58) Field of Search ..................................... 524/492, 493, 524/494, 495, 496; 523/200

(56) References Cited

U.S. PATENT DOCUMENTS

| 2,495,286 | 1/1950 | Brubaker | 260/63 |
|---|---|---|---|
| 3,694,412 | 9/1972 | Nozaki | 260/63 |
| 4,843,144 | 6/1989 | Van Broekhoven et al. | 528/392 |
| 4,880,903 | 11/1989 | Van Broekhoven et al. | 528/392 |
| 5,034,431 | 7/1991 | Hanley | 523/217 |
| 5,068,289 | 11/1991 | George et al. | 525/179 |
| 5,114,992 | 5/1992 | Hanley | 523/217 |
| 5,411,795 | * 5/1995 | Silverman | 428/229 |

FOREIGN PATENT DOCUMENTS

| 0 322 043 | 6/1989 | (EP) . |
|---|---|---|
| 0322 959 A2 | 7/1989 | (EP) . |
| 0 434 125 | 6/1991 | (EP) . |
| 0 474 308 | 3/1992 | (EP) . |
| 2 282 142 | 3/1995 | (EP) . |

* cited by examiner

Primary Examiner—James J. Seidleck
Assistant Examiner—U. K Rajguru

(57) ABSTRACT

A polyketone composition consisting of a blend of a polyketone and glass fibers having a coating composition thereon having an acrylic functionality. The molded articles of the above composition have improved tensile strength and impact resistance. The coating composition may consist of styrene-acrylonitrile copolymer or blends thereof.

10 Claims, No Drawings

KETONE POLYMER/FIBER COMPOSITIONS

FIELD OF THE INVENTION

This invention relates to a polymer composition comprising of a ketone polymer of carbon monoxide and one or more olefins. For some formulations or applications, such polymer formulation must be reinforced. Well-known reinforcing materials are fibers, particularly glass fibers, which may be in the form of thin fibers. The compositions of this invention employ fibers treated with a particular composition, which particular composition comprises an acrylic functionality moiety. The ketone polymer composition has improved impact strength. Polymers based on carbon monoxide and one or more olefins have excellent chemical resistance and can be semicrystalline with a melting point of up to 255° C. Such a class of polymers of carbon monoxide and olefins has been known for some time. U.S. Pat. No. 2,495,286 (Brubaker) disclosed such polymers of relatively low carbon monoxide content In the presence of free radical initiators, e.g., peroxy compounds. Great Britain Patent 1,081,304 discloses similar polymers of higher carbon monoxide content In the presence of alkylphosphine complexes of palladium compounds as catalyst. U.S. Pat. 3,694,412 (Nozaki) extended the reactions to produce linear alternating polymers in the presence of arylphosphine complexes of palladium moieties and certain inert solvents.

More recently, the class of linear alternating polymers of carbon monoxide and at least one ethylenically unsaturated hydrocarbon, now known as polyketones or ketone polymers, has become of greater interest. U.S. Pat. No. 4,880,903 (VanBroekhoven, et al.) discloses a linear alternating ketone terpolymer of carbon monoxide, ethylene, and other olefinically unsaturated hydrocarbons, such as propylene. Processes for production of the polyketones typically involve the use of a catalyst composition formed from a compound of a Group VIII metal selected from palladium, cobalt or nickel, the anion of a strong non-hydrohalogenic acid and a bidentate ligand of phosphorus, arsenic or antimony. U.S. Pat. No. 4,843,144 (VanBroekhoven, et al.) discloses a process for preparing a polymer of carbon monoxide and at least one ethylenically unsaturated hydrocarbon using the preferred catalyst comprising a compound of palladium, the anion of a non-hydrohalogenic acid having a pKa of below about 6 and a bidentate ligand of phosphorus. U.S. Pat. No. 4,880,903 and U.S. Pat. No. 4,843,144 are hereby incorporated by reference.

The resulting polymers are relatively high molecular weight materials having established utility as premium thermoplastics in the production of shaped articles, such as containers for food and drink and parts for the automotive industry, which are produced by processing the ketone polymer according to well known methods.

This family of polymers is called polyketones. The polyketone is, generally, semi-crystalline with a melting point in the range of about 170 to about 250° C.; depending on the polyketone olefinic monomer ratio. In the melt, the polyketone exhibits rheological behavior typical for a linear entangled flexible chain. Therefore, these polyketones are suitable for use in a broad range of processes and equipment, which have been developed for conventional thermoplastics.

The prior art reference EP Patent 0,322,959 describes reinforcement of a polyketone with an inorganic fiber. The reference discloses glass fibers coated with polyketone from a solution in m-cresol and that the glass fibers must have specific (polar) coating, which Is compatible with the polyketone.

U.S. Pat. No. 5,034,431 discloses reinforcement of polyketone with glass fibers having a specific sizing composition. The blending of polyketone and glass fibers is achieved by melt blending. The sizing composition has aminosilane and polyurethane. The sizing composition disclosed in U.S. Pat. No. 5,034,431 may also contain an epoxy functionality.

SUMMARY OF THIS INVENTION

The present invention is directed to ketone polymer compositions comprising (a) a ketone polymer of an alternating or random type, which polymer comprises carbon monoxide and at least one unsaturated compound and (b) fibers which fibers have been treated with a composition comprising an acrylic functionality. Preferably, the fibers are glass fibers coated on the surface with a composition comprising an acrylic functionality. The blend of ketone polymer and glass fibers can be prepared by blending and heating the ketone polymer and glass fibers Into a homogenous, melt processable blend. The blended composition can then be formed into finished articles by such processes as extrusion, injection molding, compression molding and extrusion blow molding.

The composition of this invention employed to treat the reinforcing fibers is comprised of a material having an acrylic functionality moiety. The acrylic functionality composition may be comprised of homopolymers, copolymers, and/or mixtures thereof, having acrylic functionality or mixtures thereof, with other materials.

DESCRIPTION OF THE INVENTION

The ketone polymers (hereinafter referred to polyketones) of this invention preferably comprise an alternating structure which contain substantially one molecule of carbon monoxide for each molecule of unsaturated compound. Suitable unsaturated compounds for use as precursors of the ketone polymers are hydrocarbons having up to 20 carbon atoms inclusive, preferably up to 10 carbon atoms, and are aliphatic such as ethylene and other α-olefins including propylene, 1-butene, isobutylene, 1-octene and 1-dodecene, or are arylaliphatic, cycloaliphatic or olefinic compounds with other functional groups such as unsaturated compounds containing an aryl substituent or containing acrylic, acetate and the like. Illustrative of this latter class of unsaturated compounds are styrene, p-methylstyrene, p-ethylstyrene or m-isopropylstyrene, acrylonitrile, methyl methacrylate and the like. The preferred ketone polymers are copolymers of carbon monoxide and ethylene or terpolymers of carbon monoxide, ethylene and a second ethylenically unsaturated hydrocarbon of at least 3 carbon atoms, particularly an a-olefin such as propylene.

Of particular interest are the polyketones of number average molecular weight from about 1000 to about 200,000, particularly those of number average molecular weight from about 20,000 to about 90,000 as determined by gel permeation chromatography. The physical properties of the polymer will depend in part upon the molecular weight, whether the polymer is a copolymer or a terpolymer and, in the case of the terpolymers, the nature and the proportion of the second unsaturated compound present Typical melting points for the polymers are from about 175° C. to about 280° C., more typically form about 180° C. to about 260° C. The polymers have a limiting viscosity number (LVN), measured in m-cresol at 60° C. in a standard capillary viscosity measuring device, from about 0.3 dl/g to about 10 dl/g, more frequently from about 0.5 dl/g to about 2 dl/g.

A method for the production of the polyketones is illustrated by U.S. Patent No. 4,843,144 (VanBroekhoven, et al.) which has been incorporated herein by reference.

The polyketones compositions of the invention comprise an intimate blend of a polyketone and a fibrous component which fibrous component has in combination therewith a composition having acrylic functionality. The blend may be prepared by mixing the components under heat and/or pressure.

The reinforcing agent is a filamentous fiber treated with a composition comprising an acrylic functionality moiety. The acrylic functionality fiber treating material may be admixed with the polyketone and fibers, but is preferably coated on the surface of the fibers before blending with the polyketone. Preferably, the filamentous fibers are glass fibers. For compositions ultimately to be employed for electrical uses, it is preferred to use fibrous glass filaments comprised of lime-aluminum borosilicate glass that is relatively sodium free. This is known as "E" glass. However, other glass compositions are useful as well. All such glasses are contemplated as within the scope of the present invention. The filaments are made by standard processes. The filament diameters preferably range from about 3 μm to about 20 μm, but this is not critical to the present invention. It is known, however, to those skilled in the art, that smaller filament diameters will also increase the strength of plastics when thermoplastics are combined therewith.

The length of the glass filaments and whether or not they are bundled Into fibers and the fibers bundled in turn to yarns, ropes or rovings, or woven into mats, and the like are also not critical to the invention. However, in preparing the molding compositions of the present invention, it is convenient to use filamentous glass in the form of chopped strands of from about 2 to about 10 mm in length. In articles molded from the compositions, on the other hand, even shorter lengths will be encountered because, during compounding, considerable fragmentation will occur.

The material for treating the fiber reinforcing agent, preferably glass fibers, may optionally contain other materials to improve bonding of the polyketone polymer composition to the reinforcing fibers. Functionalized silanes especially alkoxy silanes may be useful in this regard. Illustrative are aminopropyl triethoxy silane, glycidoxy propyl trimethoxy silane, (3,4-epoxy cyclohexyl) ethyl triethoxy silane, mercaptopropyl silane, aminoethyl aminopropyl alkoxy silane and ureidoalkyl triethoxy silanes. Most preferred are aminopropyl triethoxy silane and glycidylpropyl triethoxy silane.

The fiber treating composition may also contain other film forming materials known to those skilled in the art. Examples of film forming additives are starches, epoxy resin, polyvinyl acetate, unsaturated polyesters, polyurethane, polyvinyl pyrollidone, phenoxy resins, polyvinyl ether copolymers and the like and are stable under melt processing conditions and give fibers with good integrity.

In general, the best properties will be obtained if the filamentous glass reinforcement agent is present at a level of from at least about 1% by weight, preferably from about 1% to about 60% by weight, and most preferably from about 5% to about 50% by weight based on the total weight of the composition.

The compositions of the present invention can include, in addition to fibrous glass reinforcement of the type described, non-glass reinforced fibers in combination therewith, such as mineral reinforcing fillers, e.g. talc, clay, silica, calcium silicate, mica, and the like.

Other ingredients, such as dyes, rubbery impact modifiers, pigments, stabilizers, plasticizers, flame retardants, drip retardants and the like can be added for their conventionally employed purposes.

The compositions of the present Invention can be prepared by a number of procedures. In one way, the reinforcing glass fibers (a glass roving or a bundle of strands of glass filaments) are treated with an agent of the present invention so as to substantially coat the fibers and are then chopped into small pieces, e.g., about 2 to about 10 mm in length. The treated chopped glass fibers are fed into an extrusion compounder with the polyketone resin to produce molding pellets. In another procedure, glass filaments are ground or milled to short lengths, treated with the acrylic functional composition and then mixed with the polyketone resin by dry blending and subsequently either fluxed on a mill and ground, or they are extruded and chopped. In still another procedure, continuous lengths of glass roving are pretreated with the acrylic functional material and then drawn through a bath of melted polyketone resin and any additives, which thereby substantially coats the filaments. The resin coated treated glass strand is chopped into small cylinders, to form a molding compound. The treated glass fibers may also be mixed with resin and additives and directly molded by such techniques for example as injection or transfer molding techniques.

The acrylic functional fiber treating material employed in combination with the filamentous fibers and polyketone is comprised of an acrylic functionality. The material is preferably a film former. The acrylic functionality is derived from esters or nitrites of acrylic acid. The acrylic compounds may be best represented by the formula:

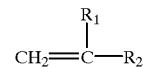

wherein $R_2$ is independently selected from $COOR_3$ or $CN$ and $R_1$ and $R_3$ are independently selected from hydrogen or a hydrocarbon radical of about 1 to about 12 carbon atoms. Preferably, $R_1$ is hydrogen or 1 carbon atom, and $R_3$ is a hydrocarbon radical of 1–12 carbon atoms and preferably 1–8 carbon atoms. Examples of acrylic compounds are styrene-acrylonitrile (SAN), copolymers of SAN with other monomers, acrylate copolymers i.e. aryl acrylates, alkyl acrylates, styrene (alkyl) acrylates and the like.

As stated previously, the acrylic functional fiber treating composition is preferably a film former and is preferably applied first to the surface of the filamentous fiber. However, it is also contemplated within the scope of this invention that the acrylic functional material may be blended with the polyketone and fiber wherein at least a portion of the material will coat the surface of the fiber. Therefore, it is preferable that at least a portion, if not, at least most of the material in the final molded article is interfaced between the surface of the fiber and polyketone.

The filamentous fiber is preferably a glass reinforcing fiber. However, other fibers are suitable in the practice of this invention and they include such fibers, but are not limited thereto, as carbon fibers, calcium silicate fibers and such other minerals or polymers, as previously disclosed, that can be spun into fibers.

The composition which is extrusion melt blended can be further processed by methods such as extrusion into sheets, films plates and shaped parts, injection molding, blow molding, vacuum forming, compression molding and the like. The compositions of the invention are particularly useful for the production of articles by multiple melting/crystallization cycles.

DETAILED DESCRIPTION OF THE EXAMPLES OF THIS INVENTION

This invention can be further described by means of the following examples; it being understood, however, that this invention shall in no way be restricted by these examples. In the examples where amounts are in terms of percent, they are percent by weight unless otherwise stated.

Example 1

All the formulations set forth in Table 1 were made by dryblending a ketone terpolymer of ethylene, propylene and carbon monoxide (polyketone) having a melting point 220° C. and a limiting viscosity number (LVN) of 0.85 as measured in m-cresol at 60° C., glass fibers, which were treated on the surface with coating compositions as set forth in TABLE 1, and stabilizers. Each dryblend was then melt blended in a PRISM 16 mm TSE corotating extruder. The temperature of the melt was about 240° C. and the screw speed was about 300 RPM. The extrudate was pelletized, dried at about 120° C. for two hours and then injection molded into test specimens employing an injection molding machine at a melt temperature in the barrel of the injection molding machine of about 230° C. and a mold temperature of about 80° C.

TABLE 1

| Coating Composition On Glass Fiber Sample | FORMULATION (weight %) | | | |
|---|---|---|---|---|
| | Polyketone | Glass Fiber | Fiber Diameter ($\mu$m) | Stabilizer |
| 1. Acrylic | 67.8 | 30 | 13 | 2.2 |
| 2. SAN-acrylate copolymer | 67.8 | 30 | 13 | 2.2 |
| 3. Epoxy | 67.8 | 30 | 13 | 2.2 |
| 4. Polyurethane/Acrylate | 67.8 | 30 | 10 | 2.2 |
| 5. Polyurethane/Epoxy | 67.8 | 30 | 10 | 2.2 |
| 6. Polyurethane | 67.8 | 30 | 10 | 2.2 |
| 7. Polyurethane/Epoxy | 67.8 | 30 | 10 | 2.2 |

SAN - styrene acrylonitrile co-polymer

The test specimens prepared above were then evaluated for tensile strength in accordance with ISO 527 and Izod Impact in accordance with ISO 180. The results obtained are shown in TABLE 2.

TABLE 2

| Glass Fiber Coated Sample | Tensile Strength (MPa) | Unnotched Izod Impact KJ/m$^2$ | Notched Izod Impact KJ/m$^2$ |
|---|---|---|---|
| 1. | 119 | 40.1 | 8.4 |
| 2. | 143 | 64.4 | 12.6 |
| 3. | 98 | 21.9 | 7.0 |
| 4. | 140 | 54.2 | 10.0 |
| 5. | 106 | 26.0 | 7.3 |
| 6. | 96 | 27.7 | 7.9 |
| 7. | 124 | 51.2 | 8.5 |

MPa - mega pascal
KJ/M$^2$ - kilo joules per square meter

All test results are the average of 5 test samples.

Example 2

Example 1 was repeated except that the polyketone used herein had a LVN of 0.6 and the glass fibers all had a fiber diameter of 10 $\mu$m. The coating on the fibers and the formulations employed are reported in TABLE 3 below.

TABLE 3

| Coating Composition on Glass Fiber Sample | Formulation (weight %) | | |
|---|---|---|---|
| | Polyketone | Glass Fiber | Stabilizer |
| 8. Polyurethane/acrylate | 68.6 | 30 | 1.4 |
| 9. SAN | 68.6 | 30 | 1.4 |
| 10. SAN/acrylate | 68.6 | 30 | 1.4 |
| 11. SAN/methacrylate | 68.6 | 30 | 1.4 |

SAN - styrene-acrylonitrile copolymer

The test specimens were evaluated in accordance with the same procedure employed in Example 1 and the results obtained are shown in TABLE 4.

TABLE 4

| Glass Fiber Coating Sample | Tensile Strength (MPa) | Unnotched Izod Impact KJ/m$^2$ | Notched Izod Impact KJ/m$^2$ |
|---|---|---|---|
| 8. | 135 | 57.8 | 9.7 |
| 9. | 148 | 67.3 | 11.1 |
| 10. | 147 | 66.6 | 10.7 |
| 11. | 149 | 66.7 | 11.0 |

MPa and KJ/M$^2$ have the same meaning as in Example 1.

All test results are the average of 5 test samples.

As shown in the Examples, test samples 1, 2, 4, 8, 9, 10, and 11 wherein the glass fibers are coated with the composition of this invention having an acrylic functionality, have greatly improved tensile strength, unnotched Izod impact strength and notched Izod impact compared to those samples 3, 5, 6, and 7, which did not have a coating composition containing an acrylic functionality. Glass fiber with coating compositions of test specimens 2, 9, 10, and 11, having an acrylonitrile functionality showed the best results.

While variations of this invention will be suggested to those skilled in the art, in view of the above disclosures, it is understood that they fall within the scope of the claims appended hereto.

What is claimed is:

1. A fiber reinforced thermoplastic aliphatic ketone polymer composition having improved impact and tensile strength which thermoplastic aliphatic ketone polymer composition comprises a blend of (1) an aliphatic ketone polymer comprised of carbon monoxide and at least one unsaturated compound and (2) filamentous fibers having a coating composition on the surface which coating composition comprises an acrylic functionality.

2. The composition of claim 1 wherein the ketone polymer is a polymer of carbon monoxide and at least one olefin.

3. The composition of claim 1 wherein the ketone polymer is about 99 to about 50 weight % based on the total weight of the ketone polymer and coated filamentous fibers.

4. The thermoplastic ketone polymer composition of claim 1 wherein the filamentous fibers are glass reinforcing fibers.

5. The thermoplastic ketone polymer composition of claim 1 wherein in the filamentous fibers are carbon fibers.

6. The thermoplastic ketone polymer composition of claim 1 wherein the coating composition comprises a blend of a styrene-acrylonitrile copolymer and a (meth) acrylate copolymer.

7. The thermoplastic ketone polymer composition of claim 1 wherein the composition having an acrylic functionality comprises a mixture of a composition having an acrylic functionality and polyurethane.

8. A molded article molded of the thermoplastic composition of claim 1.

9. The molded article of claim 8 prepared by injection molding the thermoplastic composition of claim 1.

10. A process for preparing a thermoplastic ketone polymer composition comprising the steps of (1) melt blending a ketone polymer and filamentous fibers having a coating on the surface which coating comprising an acrylic functionality, (2) extruding the melt blend of (1) and (3) pelletizing the extrudate of (2).

* * * * *